(12) United States Patent
Osborne et al.

(10) Patent No.: US 9,996,598 B2
(45) Date of Patent: *Jun. 12, 2018

(54) SYSTEM FOR DISPLAYING GRAPHICAL NARRATIONS (71) Applicant: LifeThread, LLC, Findlay, OH (US)

(72) Inventors: Brian Osborne, Findlay, OH (US); Tim Snoke, Mt. Cory, OH (US); Mark Kutscher, Findlay, OH (US)

(73) Assignee: LifeThread, LLC, Findlay, OH (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/856,696

(22) Filed: Sep. 17, 2015

(65) Prior Publication Data

US 2016/0012114 A1  Jan. 14, 2016

Related U.S. Application Data (63) Continuation of application No. 14/230,395, filed on Mar. 31, 2014, now Pat. No. 9,141,649, which is a continuation of application No. 13/508,304, filed as application No. PCT/US2010/051813 on Oct. 7, 2010, now Pat. No. 8,694,506.

(60) Provisional application No. 61/310,993, filed on Mar. 5, 2010, provisional application No. 61/249,481, filed on Oct. 7, 2009.

(51) Int. Cl.
*G06F 17/30* (2006.01)
*G06T 11/60* (2006.01)

(52) U.S. Cl.
CPC .. *G06F 17/30569* (2013.01); *G06F 17/30289* (2013.01); *G06F 17/30876* (2013.01); *G06F 17/30994* (2013.01); *G06T 11/60* (2013.01); *G06F 17/30268* (2013.01); *G06F 17/30601* (2013.01)

(58) Field of Classification Search
CPC ......... G06F 17/30289; G06F 17/30994; G06F 17/30601; G06F 17/30268
USPC ................ 707/740, 782, 709–710, 732, 770, 707/804–805; 709/201, 203, 213, 219, 709/250
See application file for complete search history.

(56) References Cited

U.S. PATENT DOCUMENTS 5,918,236 A  6/1999  Wical
5,959,621 A  9/1999  Nawaz et al.
(Continued)

OTHER PUBLICATIONS

International Search Report and Written Opinion of the International Searching Authority for PCT/US2010/051813, dated Jun. 24, 2011; ISA/KR.
(Continued)

*Primary Examiner* — Frantz Coby
(74) *Attorney, Agent, or Firm* — Harness, Dickey & Pierce, P.L.C.

(57) ABSTRACT

An online network collects a dataset of an individual's information through a computer-implemented method. An individual enters a dataset of the information and a plurality of an individual's life events into a computer system. The dataset is arranged and converted into a graphical representation for display. The online database receives and stores the dataset. The database associates the dataset with the plurality of the member's life events and then the dataset and the life events are outputted into the graphical representation for display for a witness.

11 Claims, 8 Drawing Sheets

(56) References Cited

U.S. PATENT DOCUMENTS

| | | | |
|---|---|---|---|
| 6,086,294 A | 7/2000 | Danchine et al. | |
| 6,137,496 A | 10/2000 | Cordery | |
| 6,216,141 B1 | 4/2001 | Straub et al. | |
| 7,068,189 B2 | 6/2006 | Brescia | |
| 7,340,679 B2 | 3/2008 | Botscheck et al. | |
| 7,631,040 B1 | 12/2009 | Hushyar et al. | |
| 7,681,140 B2 | 3/2010 | Ebert | |
| 8,073,967 B2 | 12/2011 | Peterson et al. | |
| 8,095,400 B2 | 1/2012 | Herde et al. | |
| 8,099,433 B2 | 1/2012 | Sittig et al. | |
| 8,127,241 B2 | 2/2012 | Blevins et al. | |
| 8,296,811 B1 | 10/2012 | Begeja et al. | |
| 8,316,307 B2 | 11/2012 | Walter et al. | |
| 8,327,266 B2 | 12/2012 | Svendsen | |
| 8,538,966 B2 | 9/2013 | Reese et al. | |
| 8,694,506 B2 * | 4/2014 | Osborne | G06F 17/30994 707/740 |
| 9,141,649 B2 * | 9/2015 | Osborne | G06F 17/30994 |
| 2002/0002558 A1 * | 1/2002 | Krause | G06Q 30/02 |
| 2003/0091352 A1 | 5/2003 | Carling et al. | |
| 2003/0095278 A1 | 5/2003 | Schwartz et al. | |
| 2003/0135431 A1 | 7/2003 | Schwartz et al. | |
| 2003/0139982 A1 | 7/2003 | Schwartz et al. | |
| 2003/0187735 A1 | 10/2003 | Francois Olivier | |
| 2003/0187862 A1 | 10/2003 | Brobst | |
| 2004/0165007 A1 | 8/2004 | Shafron | |
| 2005/0132016 A1 | 6/2005 | Boone | |
| 2005/0135793 A1 | 6/2005 | Mindrum et al. | |
| 2007/0168368 A1 | 7/2007 | Stone | |
| 2007/0216535 A1 | 9/2007 | Carrino | |
| 2007/0219996 A1 | 9/2007 | Jarvinen | |
| 2007/0233736 A1 * | 10/2007 | Xiong | G06Q 30/02 |
| 2007/0250479 A1 | 10/2007 | Lunt et al. | |
| 2008/0091486 A1 | 4/2008 | Aoyama et al. | |
| 2008/0172461 A1 | 7/2008 | Thattai et al. | |
| 2008/0294663 A1 | 11/2008 | Heinley et al. | |
| 2010/0131574 A1 | 5/2010 | Reese et al. | |
| 2010/0131882 A1 | 5/2010 | Reese et al. | |
| 2010/0132023 A1 | 5/2010 | Reese et al. | |
| 2010/0161379 A1 | 6/2010 | Bene et al. | |
| 2010/0175006 A1 * | 7/2010 | Li | G06F 17/30672 715/764 |
| 2010/0205179 A1 | 8/2010 | Carson et al. | |
| 2011/0125741 A1 | 5/2011 | Brobst | |
| 2011/0200052 A1 | 8/2011 | Mungo et al. | |
| 2013/0080897 A1 | 3/2013 | Han et al. | |

OTHER PUBLICATIONS

International Preliminary Report on Patentability (Chapter 1 of the Patent Cooperation Treaty), dated Apr. 11, 2012.

* cited by examiner

Figure 8

SYSTEM FOR DISPLAYING GRAPHICAL NARRATIONS

CROSS-REFERENCE TO RELATED APPLICATIONS

This application is a continuation of U.S. application Ser. No. 14/230,395, filed Mar. 31, 2014, which is a continuation of U.S. application Ser. No. 13/508,304, filed May 4, 2012, which is a National Phase of PCT/US2010/051813, filed Oct. 7, 2010, which claims the benefit of U.S. Provisional Application No. 61/310,993, filed on Mar. 5, 2010 and U.S. Provisional Application No. 61/249,481, filed on Oct. 7, 2009. The entire disclosure of each of the above applications is incorporated herein by reference.

FIELD

The present disclosure relates to an online network and more particularly to an online network system for a computer using graphical presentations of an individual's life story, and the spatial and virtual interaction of the individuals with other individuals or organizations.

SUMMARY

This section provides a general summary of the disclosure, and is not a comprehensive disclosure of its full scope or all of its features.

The present disclosure provides a computer system for entering, storing, and displaying a dataset of an individual or member's information to an online database, and more specifically arranges and converts the dataset into a graphical representation for display. The system includes a user interface, such as a graphical user interface, for a member to enter the pre-narrative information. The information generally describes a member's life story by life events. For example, a life event could be when the member was born, graduated from high school, married, or passed away.

The system includes a database for storing a dataset of a member's information. The database arranges the dataset into chronological order and associates the dataset with a plurality of life events of a member's life. The dataset and life events are outputted into a graphical representation. For example, a graphical representation illustrates the dataset and life events using a combination of pictures and text to create a visual narration of a member's life thread.

The visual narration can be viewed by other members of the social network or database. The other members can act as a witness and provide a comment regarding the life event, thus causing interaction between LifeThreads. The comment is displayed separate from the visual narration. Prior to the comment being displayed, the comment is validated. Validation of a life event can occur if a witness also has a visual narration and comments on the event or provides documentary evidence.

Disclosed is a method of implementing a method on a network of computer devices. The method includes entering a first data set of a first member's information and a plurality of first member's life events into a first computer device. The data set is stored at a second data base at a second computer device. At least one of the pluralities of first member's life events is validated.

According to the present teachings, validation of the first member's life events is receiving a second data set of information related to the one of the plurality of first member's life events from a second member and linking the second data set to the first data set. Further, according to the present teachings, the first data set can be a linked list.

Further, according to the present teachings, a system for recording and displaying events related to first and second individuals is presented. The system further records interactions between the individuals. These interactions can be life events, emails, interactions, whether virtual or physical.

According to another embodiment, a system for collecting life information for a deceased individual is presented. The system includes a mechanism for automatically collecting data related to a deceased individual.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, used herein, the term member may be interchanged for the term individual. This individual may or may not have knowledge of the computer system described herein. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Example embodiments will now be described more fully with reference to the accompanying drawings.

In accordance with the present disclosure, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope of the inventive concepts disclosed herein.

Figure 1:
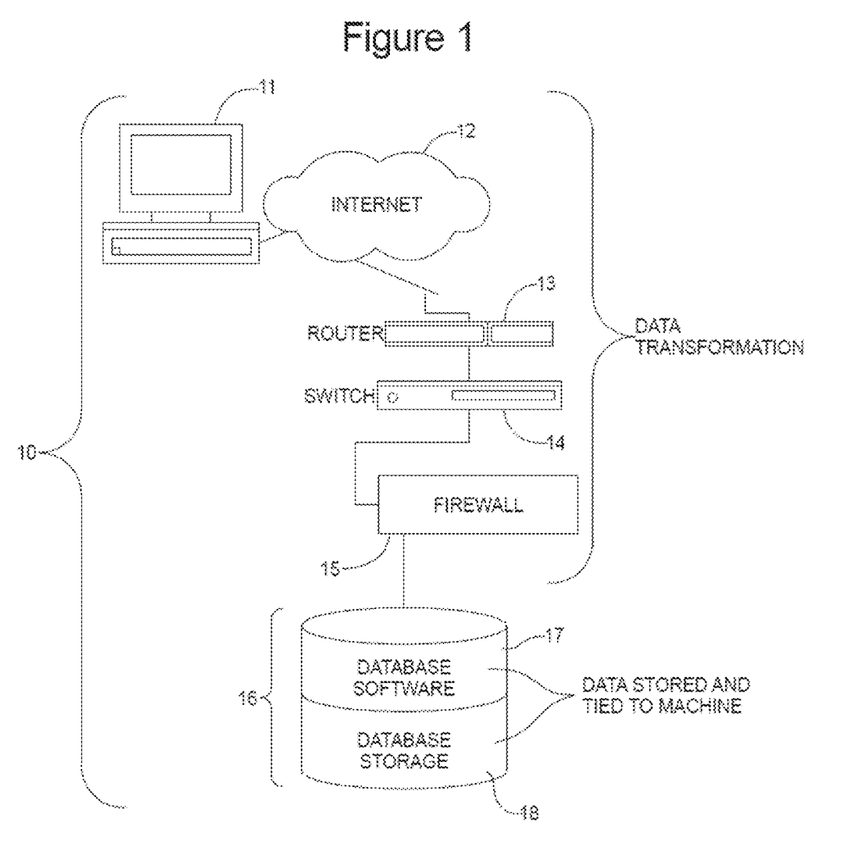
FIG. 1 shows a diagram of a computer system according to the present teaching.

Referring to FIG. 1, a computer system 10 is shown. The computer system 10 incorporates a user interface apparatus 11 within a computer device, for example a graphical user interface (GUI), which connects to the Internet 12. As well known in the art, the user interface 11 is connected to the Internet 12 through a router 13 and switch 14. A router 13 joins a local area network (LAN) to the wide-area network (WAN) of the Internet. A switch 14 is the central device in a LAN that directs traffic across the LAN. The firewall 15 blocks unauthorized access to the computer system while permitting authorized communications. The database 16, stored on a second computer device, is accessible from the computer system through the Internet. The database software 17 can be, for example, a database management system (DBMS). The DBMS is a set of software programs that controls the organization, storage, management, and retrieval of data in a database. The database storage 18 stores data such as information, texts, images, or media files.

Figure 2:
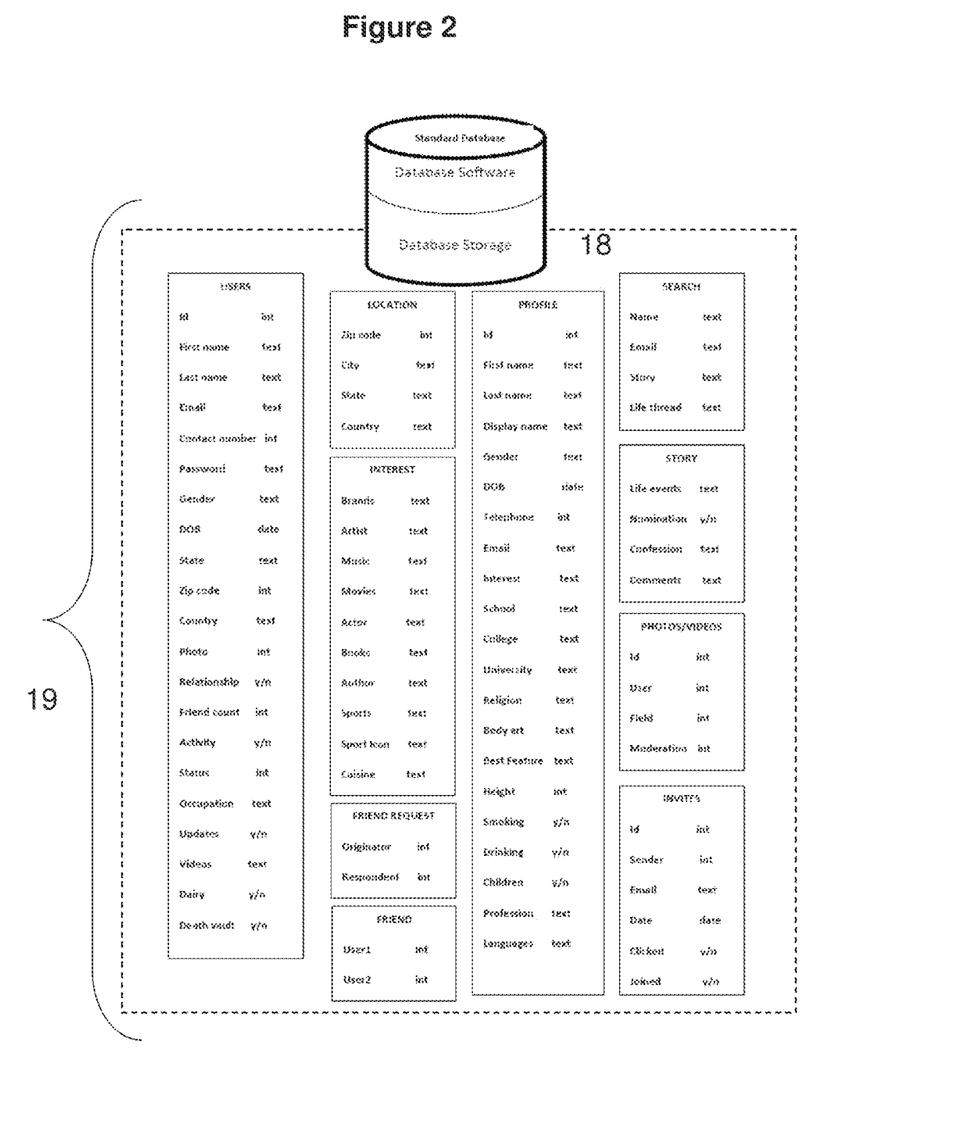
FIG. 2 illustrates the types of data stored in the database of the present disclosure.

FIG. 2 illustrates the types the data 19 that can be stored in the database storage 18 in the form of a linked list. When a member registers with the online system data about that member is requested. The data requested is personal information about the member such as address, email address, and full name. Additionally, the data 19 can relate to a physical and virtual location of an individual within space and time. In this regard, physical locational data can be acquired using, for instance, GPS or mobile electronic device (cell phone) positional information. With respect to virtual locational data, an individual's virtual presence and connection to a computer system can be stored. In this regard, the connection to social media, chat sessions, or message board systems can be stored. When the interaction of a pair of individuals or members is being reviewed, the member's life story can be shown in an interactive linear graphical representation. As described in further detail below, the physical or virtual interaction between individuals can be shown on the graphical representation. The representation of any member of individual's life threads can be interlinked to another's life thread by common occurrence of events or interactions through time. These may be, for example, when both individuals are linked by being in the same relative location at the same time, an email from one individual to another, or a link through a computer network.

After registration is complete a member, using a user interface, enters information in the form of a data set describing the member's life story by life events. For example, the member can enter information relating to a birth date, a birthday, a wedding and other important moments that signify meaningful changes in member's life. A member can, for example, be one's own self, a family member, or a friend of the member. For example, a sibling may enter information describing another sibling's life story by life events. Optionally, portions of an individual's life can be described or entered by others or can be collected from official preapproved data collection sources. In this regard, the preapproved data collection sources can be governmental or private databases. Optionally, data can be collected in near real time from data collection organizations such as phone or internet companies.

Figure 3:
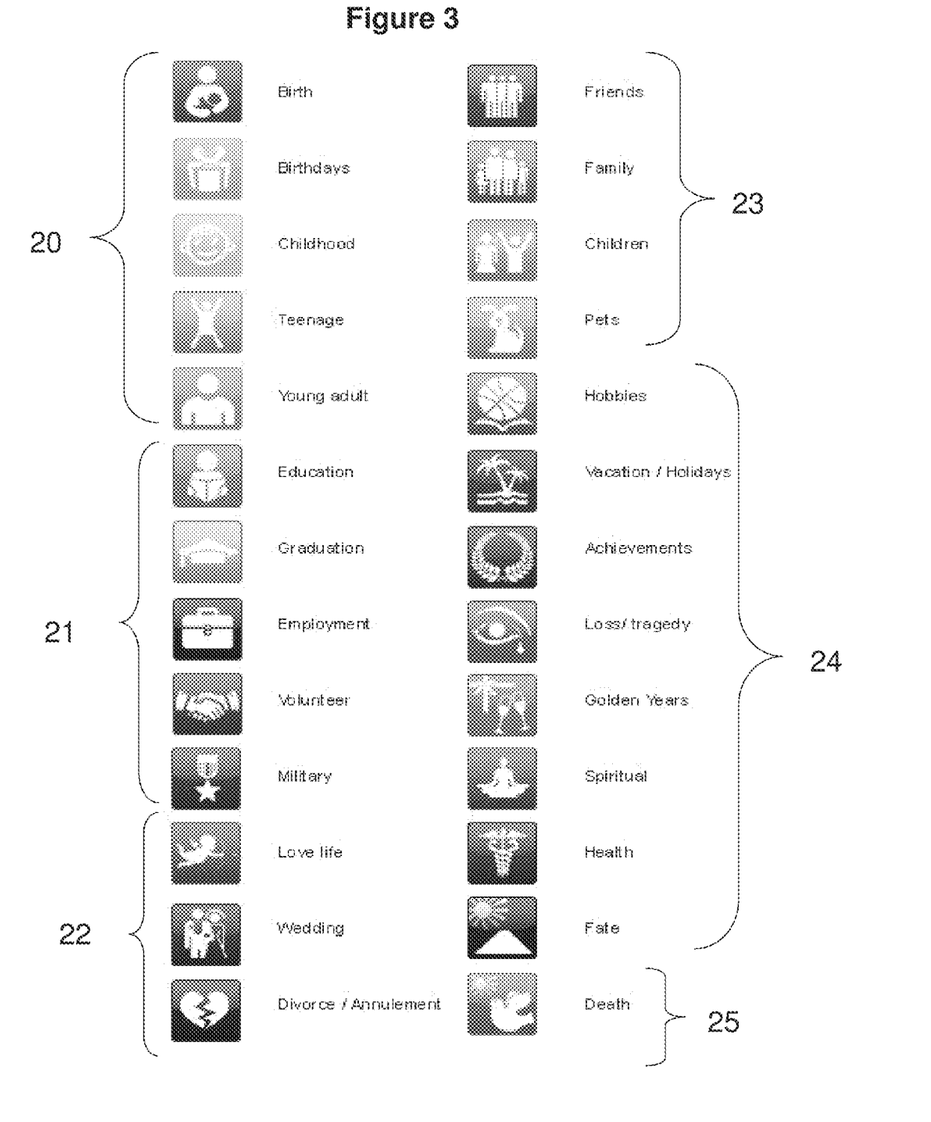
FIG. 3 shows a dataset of life stages and life events.
Figure 4:
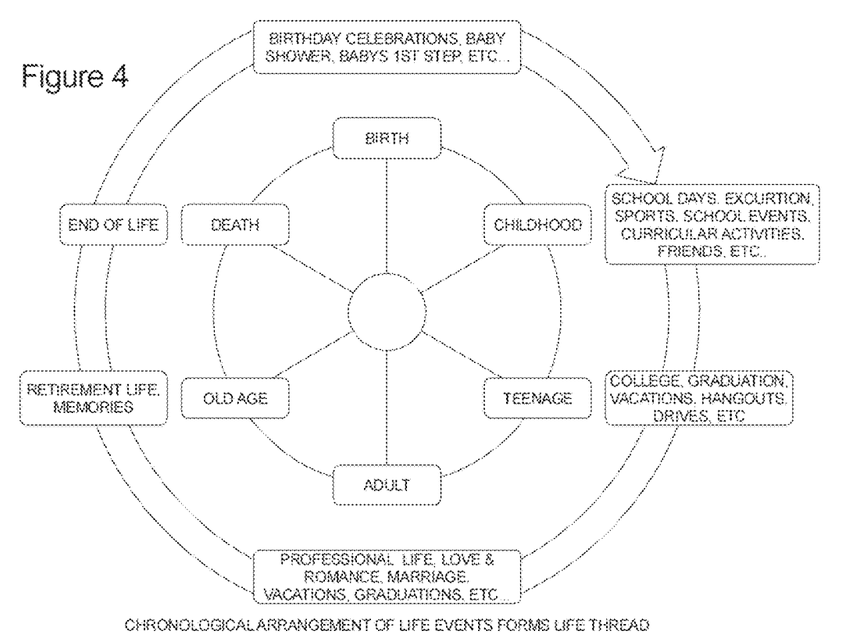
FIG. 4 illustrates the chronological arrangement of life events.

The member's life story is broken down by life stages. The life stages illustrated in FIG. 3 are Child Development 20, Career 21, Personal Life 22, Relationships 23, Experiences 24 and Death 25. The life stage can be further broken by a particular life event such as birth, graduation, divorce, hobbies, employment, and military service. As illustrated in FIG. 4, when all the life events are entered the events are chronologically ordered by the database to form a life thread. A life thread is the chronological visual narration of a member's life events.

To enter information, an individual is queried by a first computer device, as to the title of an event as well as the content and context of the story. Optionally, the date the event occurred as well as the category which best fits the event can be inputted. The first computer device then allows an individual to upload media (photo, video, audio, or data) related to the event. Once uploaded, other individuals can comment or bear witness to the event. This comment can include an estimate of the likelihood an event occurred. As described herein, the member can use the skeleton key feature to prevent these comments and witnesses from automatically showing in the event page.

In this regard, with skeleton key feature, the member has the ability to choose which comments or witnesses will be visible. It is envisioned the skeleton key can be found in the references and dashboard of the application. Witnesses can be required to have an account with the system. The witness opens the event to be commented on. Optionally, the witness member can upload additional media to a particular event. The system can allow the witness to textually comment on the media. If the events skeleton key is on, the witness comments and media is subject to approval prior to the uploading being publically available.

Figure 5:
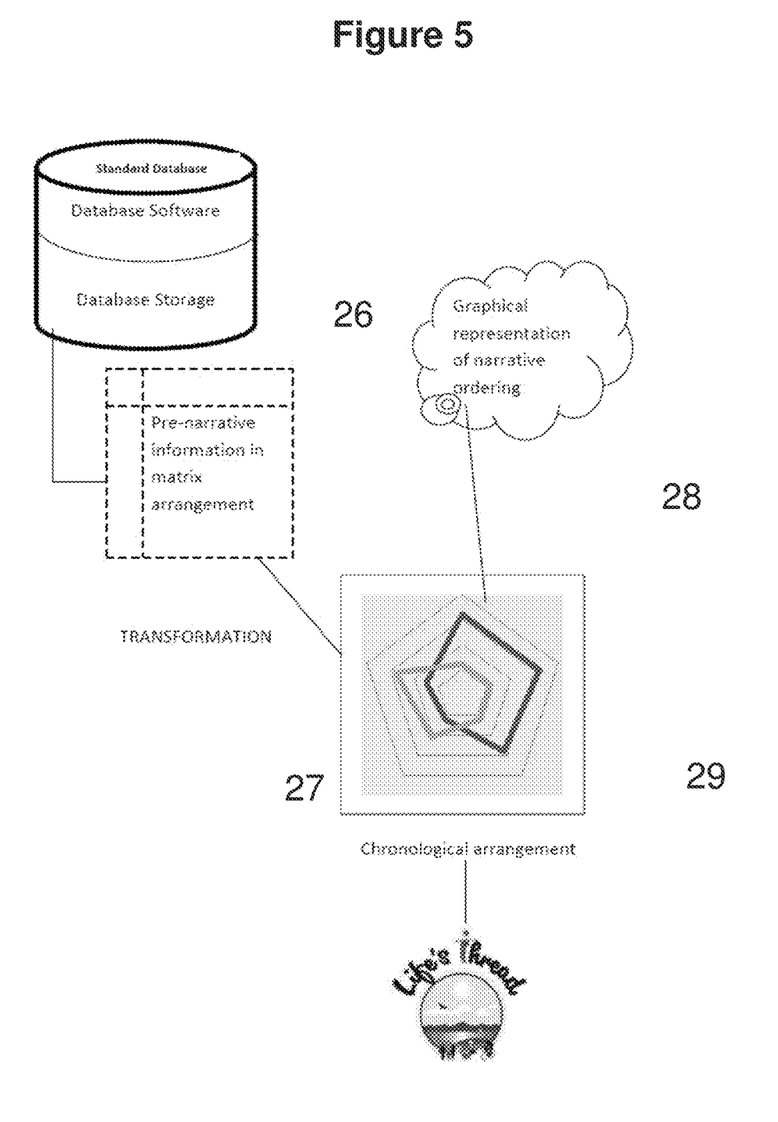
FIG. 5 illustrates the steps of outputting the dataset and life events into a life thread.

After the entire member's life events are entered into the database the dataset is associated with the corresponding life event. The dataset and life events are arranged 26 in chronological order and converted 27 into a graphical representation. As seen in FIG. 5, the dataset and life event are then outputted into a graphical representation 28 in chronological order into a life thread 29.

Figure 6A:
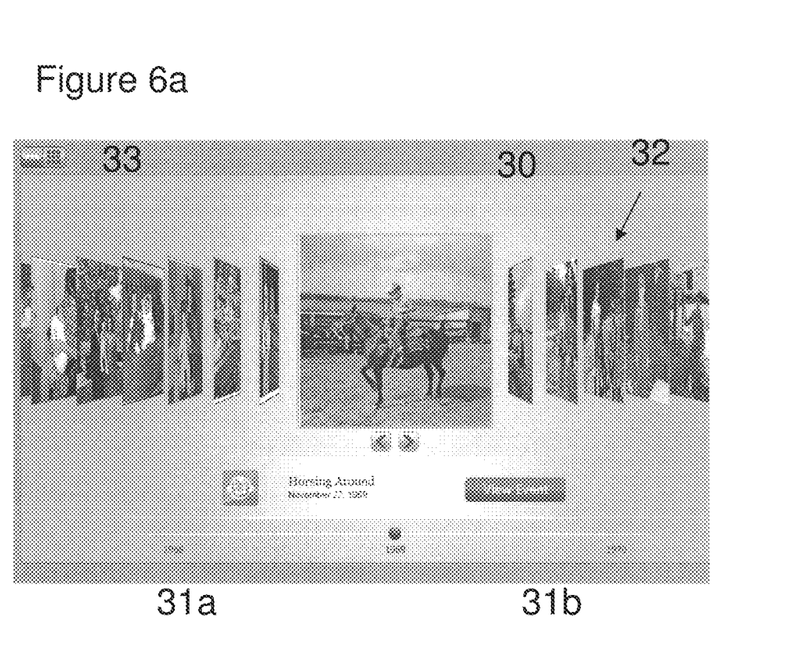
FIGS. 6a and 6b illustrate a visual narration and a witness comment about a visual narration.
Figure 6B:
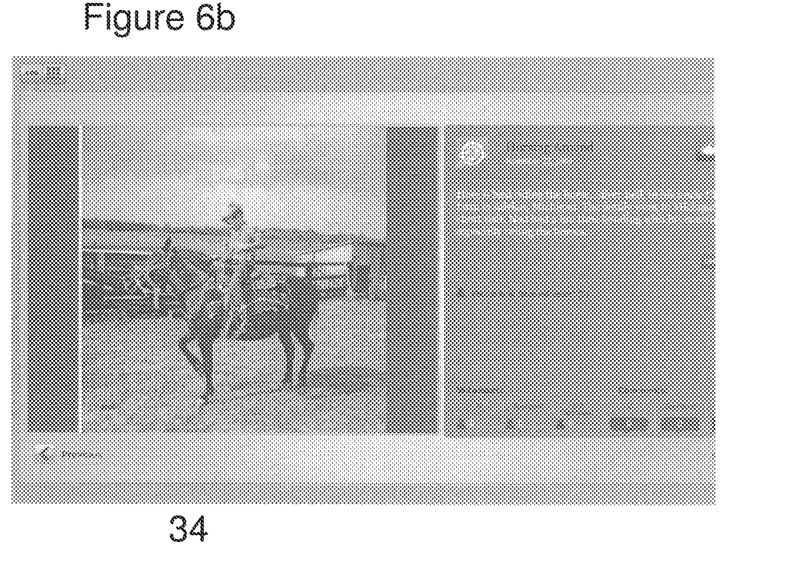

Once all the information relating to an individual's life story is entered into the dataset, the database arranges the dataset into chronological order and converts the chronologically ordered dataset into a graphical representation. FIGS. 6a and 6b illustrate a computer-implemented method for arranging and converting the dataset into a graphical representation for display. Referring to FIGS. 2 and 3, a member or individual enters a dataset of information and the individual's life events into a database for storage. The dataset and the life events are associated by the database and chronologically ordered. Referring to FIG. 5, the dataset and life event are then outputted into a graphical representation 28 in chronological order into a life thread 29.

As seen in FIG. 6a, graphical representation is a combination of the photographs 30 and text 31a that create a visual narration 32 based on a member's life events. The events of the member's life are described through text 31a and images 30. The member can also enter facts that relating to the photograph that visually describes the member's life event. As seen in FIG. 6a, the member enters information 31b relating to the year the photograph was taken and a description of the photograph. The photograph is also labeled by life event 33.

The visual narration 32 illustrates a member's life story. The visual narration is accessible by other members of the social network. The member's visual narration may be viewed any member who also has a visual narration. As seen in FIG. 6b, another member can act as a witness to the life event and provide a comment on one of the plurality of a member's life events to validate the events. The member's comment 34 is displayed separately from the visual narration. When another member provides a comment regarding a member's particular event, that comment is validated prior to being displayed. Optionally, a member may only comment on another's member's visual narration if that member also has a visual narration. The member's comment may be validated by documentary evidence. Documentary evidence may include other photographs taken at the event, vital record certificates (births, deaths, marriages, divorces), correspondence (letters, postcards, emails), and programs (graduation, marriage, funerals). As those skilled in the art understand, additional types of documentary evidence can be used such as data from public or private database records.

Figure 7A:
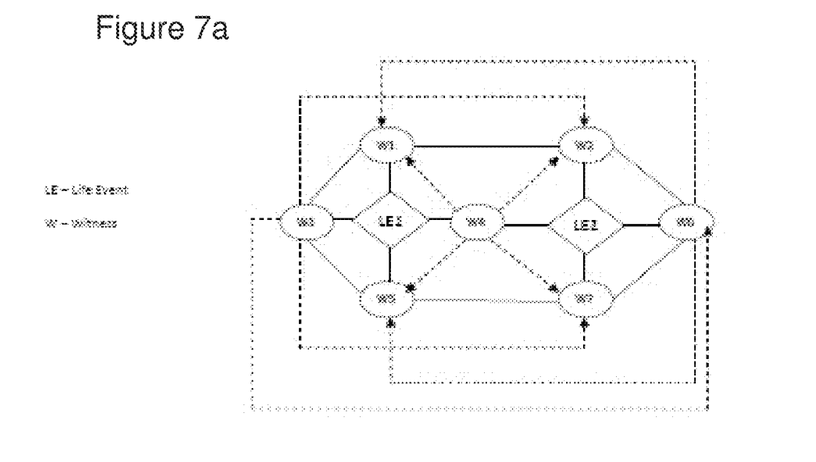
FIGS. 7a and 7b illustrate how life event connections and how that vary from other social networks.
Figure 7B:
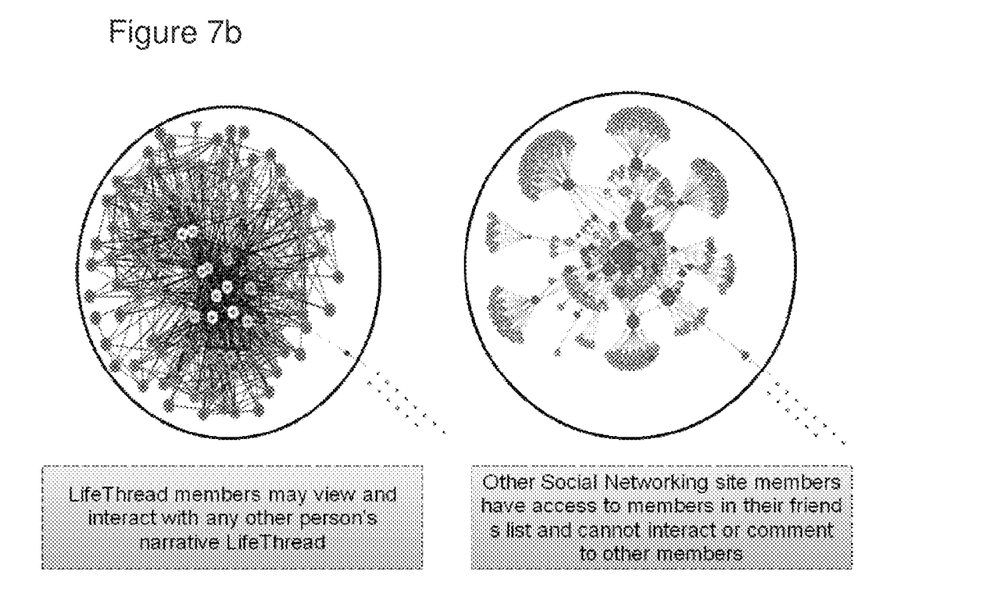

FIG. 7a illustrates the connection between an individual's life event and another member who witnesses the life event. Other members who witness the life event can all be connected by that life event. Optionally, as illustrated in FIG. 7b, once these members are connected they can then view other life threads. This is different than other social networks where the members are clustered and do not have access outside their cluster of connections. In the other social networks a member have restricted access to other member's profiles and cannot view or comment on other members without permission.

Figure 8:
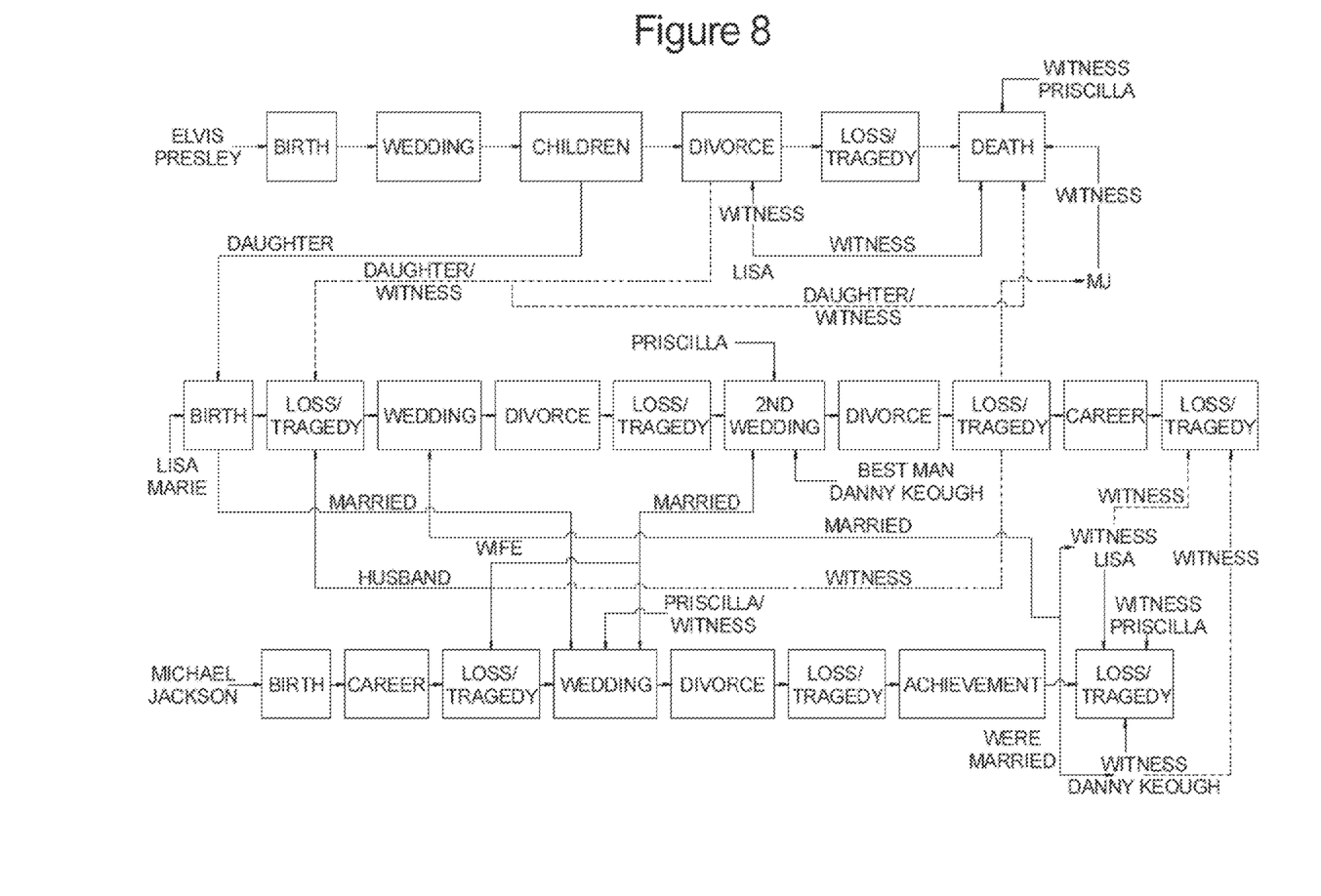
FIG. 8 provides an example of life events connecting witnesses.

FIG. 8 provides an example how one individual's life threads connects to other individual's life threads through each individual's life events. The connections to other individuals are represented by the lines. As illustrated, Elvis Presley connects to Michael Jackson through Lisa Marie. Each of the life threads are organized chronologically by life events. As previously discussed, and illustrated by FIGS. 3 and 4, life stages are broken down into life events. These life events are chronological ordered by text and images to form the visual narration of the individual's life thread. As illustrated in FIG. 8, Michael Jackson's life thread is connected to Elvis Presley's life thread by Michael's marriage to Lisa Marie. Elvis was married to Priscilla, who may have acted as a witness to the marriage of Michael and Lisa, the death of Elvis, and the death of Michael Jackson. Lisa also may act as a witness to the death of her father or Michael Jackson.

The interactions are shown herein as arrowed, dashed, and solid lines. The links between the individuals can occur based through events where the individuals have physical interaction with each other. In situations where a link between individuals are witnessed or validated, the link between the individuals can be given a greater weight. This weight can also be increased using validation by public records such as a birth certificate.

According to the above description, a computer-implemented method for arranging and converting a dataset into a graphical representation for display is shown. At first, a dataset of individual's information and a set of the individual's life events are entered into a computer system database. The dataset and the life events are placed into chronological order and outputted into the graphical representation for display as a life thread. Optionally, comments can be made by the individual or others related to the life events. These comments can be verified by links to official documents or comments or attributions by witnesses.

Optionally, the plurality of first individual's life events can be formed from a second data set of information related to the one of the plurality of first individual's life events from a second individual, and linking the second data set to the first data set. The first data set can be a computer storage structure such as a linked list. Optionally, an event can be formed from data related to one of the plurality of life events with data stored on a third computing device, using publically available documentary evidence. Validation of the first individual's information can be accomplished by comparing the first individual's information with comments by a second member. It is envisioned that the linking events can include comparing the geographic location of the first and second individuals, or contact with a computer system by at least one individual.

The method for displaying a graphical narration of the interaction of first and second individuals can include storing in a first set of database locations a first set of events related to the first individual. The first set of events can then be placed into chronological order. A second set of database locations can be associated with a second plurality of events related to the second individual. Afterward, the second plurality of events can be placed in chronological order. Linking at least one of the first plurality of events to one of the at least one of the second plurality of events is then done. Optionally, the linking of at least one of the first plurality of events to one of the at least one of the second plurality of events can be the first individual giving attribution to at least one of the second plurality of events. The linking of at least one of the first plurality of events to one of the at least second plurality of events can also be linking the events with a linking piece of documentary evidence. Optionally, the documentary evidence is one of mobile electronic device positional data, the interaction with the computer network, and a publically available document.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, it is envisioned multiple program languages such as PHP and Rubie language while the data base can be programmed in MySQL and MongoDB. Optionally, wherever data entry by a "member" is indicated herein, the data may be entered with respect to the member or individual by another. Further, it is envisioned than an individual within the system may not have knowledge that they are a subject of the system. Further, it is envisioned the computing devices can be personal or mainframe computers, or cell phones.

The same may also be varied in many ways. Such variations are not to be regarded as a departure from the disclosure, and all such modifications are intended to be included within the scope of the disclosure.

What is claimed is:

1. A computer-implemented method for receiving, arranging and converting data stored in a non-transitory computer-readable medium into a graphical representation for display, the method comprising:
   receiving and storing in a computer system a first set of data concerning a plurality of life events that have occurred in a first person's life;
   receiving and storing in a computer system a second set of data concerning a plurality of life events that have occurred in a second person's life;
   selectively generating links between events of the first person and events of the second person based upon geographic location data associated with the first person and geographic location data associated with the second person, by generating a link between a particular life event of the first person and a particular life event of the second person if the geographic location data associated with the particular life event of the first person corresponds to the geographic location data associated with the particular life event of the second person;
   chronologically ordering the plurality of life events of the first person;
   causing the chronologically-ordered plurality of life events of the first person to be displayed;
   causing the links between life events of the first person and life events of the second person to be displayed in association with the display of the chronologically-ordered plurality of life events of the first person;
   chronologically ordering the plurality of life events of the second person; and
   causing the chronologically-ordered plurality of life events of the second person to be displayed.

2. The computer-implemented method of claim 1, wherein the link is generated only if time data associated with the particular life event of the first person corresponds to time data associated with the particular life event of the second person.

3. The computer-implemented method of claim 1, wherein said geographic location data is acquired using GPS data transmitted from a mobile electronic device.

4. The computer-implemented method of claim 1, wherein data concerning a plurality of life events includes media, including at least one of photo, video and audio.

5. The computer-implemented method of claim 1, further comprising the step of causing the links between events of the first person and events of the second person to be displayed in association with the display of the chronologically-ordered plurality of life events of the second person.

6. The computer-implemented method of claim 5, wherein the chronologically-ordered plurality of life events of the first person and the chronologically-ordered plurality of life events of the second person are displayed concurrently.

7. A computer-implemented method for arranging and converting data stored in a non-transitory computer-readable medium into a graphical representation for display, the method comprising:
   receiving and storing in a computer system a first set of data concerning a plurality of life events that have occurred in a first person's life;
   receiving and storing in a computer system a second set of data concerning a plurality of life events that have occurred in a second person's life;
   selectively generating a link between an event of the first person and an event of the second person based upon receipt of an attribution by the first person to at least one of the life events of the second person;
   chronologically ordering the plurality of life events of the first person;
   causing the chronologically-ordered plurality of life events of the first person to be displayed;
   causing the links between events of the first person and events of the second person to be displayed in association with the display of the chronologically-ordered plurality of life events of the first person;
   chronologically ordering the plurality of life events of the second person; and
   causing the chronologically-ordered plurality of life events of the second person to be displayed.

8. The computer-implemented method of claim 7, wherein data concerning a plurality of life events includes media, including at least one of photo, video and audio.

9. The computer-implemented method of claim 7, further comprising the step of causing the links between events of the first person and events of the second person to be displayed in association with the display of the chronologically-ordered plurality of life events of the second person.

10. The computer-implemented method of claim 9, wherein the chronologically-ordered plurality of life events of the first person and the chronologically-ordered plurality of life events of the second person are displayed concurrently.

11. A computer-implemented method for arranging and converting data stored in a non-transitory computer-readable medium into a graphical representation for display, the method comprising:
   receiving and storing in a computer system a first set of data concerning a plurality of life events that have occurred in a first person's life;
   receiving and storing in a computer system a second set of data concerning a plurality of life events that have occurred in a second person's life;
   selectively generating a link between an event of the first person and an event of the second person based upon a linking document;
   chronologically ordering the plurality of life events of the first person;

causing the chronologically-ordered plurality of life events of the first person to be displayed;

causing the links between events of the first person and events of the second person to be displayed in association with the display of the chronologically-ordered plurality of life events of the first person;

chronologically ordering the plurality of life events of the second person; and causing the chronologically-ordered plurality of life events of the second person to be displayed, further comprising the step of causing the link between the life event of the first person and the life event of the second person to be displayed in association with the display of the chronologically-ordered plurality of life events of the second person and wherein the chronologically-ordered plurality of life events of the first person and the chronologically-ordered plurality of life events of the second person are displayed concurrently.

* * * * *